United States Patent [19]

Patton et al.

[11] Patent Number: 5,840,181
[45] Date of Patent: Nov. 24, 1998

[54] CHROMATOGRAPHIC SEPARATION OF FATTY ACIDS USING ULTRAHYDROPHOBIC SILICALITE

[75] Inventors: Robert Lyle Patton, Rolling Meadows; Beth McCulloch, Clarendon Hills; Peter K. Nickl, Des Plaines, all of Ill.

[73] Assignee: UOP LLC, Des Plaines, Ill.

[21] Appl. No.: 949,604

[22] Filed: Oct. 14, 1997

[51] Int. Cl.[6] .................................................. B01D 15/08
[52] U.S. Cl. .................................. 210/198.2; 210/502.1; 210/656; 502/407
[58] Field of Search .................................. 210/635, 656, 210/198.2, 502.1; 502/407

[56] References Cited

U.S. PATENT DOCUMENTS

| | | | |
|---|---|---|---|
| 4,061,724 | 12/1977 | Grose et al. | 423/335 |
| 4,073,865 | 2/1978 | Flanagen et al. | 423/339 |
| 4,375,568 | 3/1983 | Izod et al. | 568/758 |
| 4,521,343 | 6/1985 | Chao | 260/419 |
| 4,560,675 | 12/1985 | Clearly | 502/407 |
| 4,650,783 | 3/1987 | Chao | 502/407 |
| 4,746,763 | 5/1988 | Kocal | 585/417 |
| 5,052,561 | 10/1991 | Miller | 208/137 |
| 5,529,686 | 6/1996 | Hagen | 210/198.2 |

*Primary Examiner*—Ernest G. Therkorn
*Attorney, Agent, or Firm*—Thomas K. McBride; Frank S. Molinaro; Maryann Maas

[57] ABSTRACT

Silicalite with increased hydrophobicity may be made by steaming silicalite in an atmosphere of at least 10% water vapor at temperatures of 650°–850° C. When used as monodisperse spheres with a diameter in the range 1–20 microns such ultrahydrophobic silicalite is an excellent adsorbent for chromatographic separation of polar materials, including fatty acids, at both the analytical level and preparative level using simulated moving bed techniques.

5 Claims, No Drawings

CHROMATOGRAPHIC SEPARATION OF FATTY ACIDS USING ULTRAHYDROPHOBIC SILICALITE

BACKGROUND OF THE INVENTION

The use of zeolitic materials, and even more generally molecular sieves, in various separations of organic materials is too well known to require extensive comment. Their ability to separate materials based on size differences of the substrates has been found especially useful and has led to a plethora of commercial processes. Although size-based separations are attributed to pores or channels within the crystalline framework of zeolites and molecular sieves, often superimposed on this are charge or van der Waals effects between the surface of the adsorbent and some portion of the substrate molecule.

Silicalites constitute a class of materials which may be viewed as a microporous silica polymorph with the same topology as ZSM-5, i.e., MFI topology. Although synthesis using exceptionally pure reagents can produce an essentially pure silica silicalite, in most usual preparations small amounts of aluminum in the variously employed starting silica sources result in silicalites with typical product silica to alumina ($SiO_2.Al_2O_3$) oxide rations in the range of 200 to 1000. Separations effected with silicalite are based largely on van der Waals effects with the nature of the silicalite surface playing a dominant role.

Silicalites as a class are hydrophobic, yet there remains a residual affinity for water and other polar materials which affect the characteristics of silicalites as adsorbents. One general result of residual hydrophilicity, thought to arise from silanol groups, Si—OH, is substantial tailing of polar materials, for example, alcohols, as adsorbates in chromatographic separations. Clearly, tailing interferes with a chromatographic separation being used either as an analytical tool, because of the difficulty of accurate integration of an asymmetric detector response, or as a purification tool where the tail of a component may extend into the eluate fraction of a different component. Izod et al. recognized this shortcoming, and in U.S. Pat. No. 4,375,568 described the use of F-silicalite (U.S. Pat No. 4,073,865) in the separation of low molecular weight alcohols, ethylene glycol, and water.

F-silicalite is a silica polymorph containing approximately 0.9% fluorine prior to removal of the template, with properties quite similar to silicalite. It is distinguishable from the latter after calcination in air by its X-ray diffraction pattern, water adsorption properties, and infrared absorption spectrum. Unfortunately, F-silicalite normally is formed as laths, typically of a size 20×20×150 microns. Such a crystal form is quite unsuitable for high pressure liquid chromatography (HPLC), where the adsorbent preferably is in the form of monodisperse spheres, i.e., spheres of the same size or within a very narrow size range, of size 1 to 20 microns to insure a high loading of adsorbent without excessive pressure drop. Accordingly, there is a need for a silicalite whose morphology better approximates the ideal of 1–20 micron monodisperse spheres with an exceptional degree of hydrophobicity.

Fatty acids, especially linear, terminal carboxylic acids in the C10–C20 range, are components of many products, especially edible oils, and their measurement is a routine analytical need. Because of the high polarity of carboxylic acids, which leads to their severe tailing on most adsorbents used in chromatography, perhaps the most prevalent analytical technique requires their conversion to an ester, which is far less polar than the precursor carboxylic acid, with subsequent analysis of the resulting ester. Although this conversion is routine, clearly it is desirable to be able to perform analysis on the fatty acids themselves. It occurred to us that extremely hydrophobic silicalites—a type which we refer to as ultrahydrophobic silicalite—would be especially suitable for this type of analysis. Since HPLC is the analytical method of choice, it appeared to us that monodisperse ultrahydrophobic silicalite spheres of 1–20 micron diameter would prove particularly suitable. In fact, this turned out to be the case. Our invention, then, is ultrahydrophobic silicalite of a particular morphology, viz, monodisperse spheres of 1–20 micron diameter. In another aspect, our invention is the separation of fatty acids on ultrahydrophobic silicalite monodisperse spheres in the 1–20 micron diameter size range. Yet another aspect of our invention is the preparation of ultrahydrophobic, monodisperse silicalite spheres of 1–20 micron diameter.

SUMMARY OF THE INVENTION

The purpose of our invention is to prepare silicalite with optimum properties for the separation of high polar organic materials by high pressure liquid chromatography. An embodiment comprises as an article of manufacture ultrahydrophobic monodisperse silicalite spheres of 1–20 micron diameter. Another embodiment is a process for the separation of fatty acids contained in a mixture by using ultrahydrophobic silicalite monodisperse spheres of diameter 1–20 microns as the adsorbent in a chromatographic separation. Yet another embodiment is a process for preparing ultrahydrophobic monodisperse silicalite spheres of 1–20 micron diameter comprising steaming monodisperse, calcined silicalite in the temperature range between about 650° and about 850° C. for a time effective to reduce water adsorption at room temperature and 4.6 mm water vapor pressure to less than 1 weight percent. Other purposes and embodiments will be clear from the following exposition.

DESCRIPTION OF THE INVENTION

The separation of highly polar organic materials by high pressure liquid chromatography to the degree necessary in analytical methodology has proved to be a difficult task. Although silicalite has been previously utilized in such separations it generally has been found wanting; peak separations often are inadequate and tailing has been a major complicating factor. After considerable experience in data collection in this area we have identified several factors which appear to collectively serve as an indispensable prerequisite for an "ideal" silicalite which broadly serves the need as an adsorbent for effective separation of highly polar organic materials to afford analytical-quality separations. We have determined that the requisite silicalite must be monodisperse spheres of a critical particle size, that the spheres disperse readily in organic solvents for slurry packing, and that the silicalite have minimum hydrophobicity. We have further determined the mode of preparation necessary to afford such silicalite as an article of manufacture. The highly polar organic materials which are being separated by the ultrahydrophobic silicalite of this invention include carboxylic acids, alcohols, and phenols.

A prime requisite of the silicalite used in the practice of our invention is that it be present as monodisperse spheres. "Monodisperse" refers to the size distribution of the individual silicalite particles, and in particular means that the sizes in a collection of particles are limited to a narrow range. Specifically, if $d_{P80}$ be the size (i.e., diameter) limiting 80% of the total weight of particles, and $d_{P20}$ be the size limiting 20% of the total weight of particles, then their ratio, $d_{P80}/d_{P20}$, must be no greater than about 1.5 to qualify as monodisperse in the context of our invention. Furthermore, the ratio $d_{P50}/d_{P10}$ must be no greater than about 1.2. Such monodisperse silicalite spheres are known to those skilled in the art and in fact often are formed incident to usual high pH preparation of silicalite. We have found that for use in HPLC analytical separations the spheres may be of a size between about 1 up to about 10 microns, more preferably between about 2 and about 6 microns, and most preferably between about 3 and about 5 microns. Thus, a monodisperse silicalite sphere of 4 microns diameter would have a mass percent distribution of particle diameters such as to give an average diameter of 4 microns and have a distribution such that $d_{P80}/d_{P20}$ is no more than about 1.5 and $d_{P50}/d_{P10}$ is no more than about 1.2. We have experimentally observed that an insufficiently narrow particle size distribution leads to poor resolution and tailing. Because sieving is wasteful, it is an economic imperative to initially prepare silicalite of the appropriate monodisperse particle size.

Although silicalite is itself hydrophobic, nonetheless usual preparations contain sufficient residual silanols to degrade the separation of highly polar organic materials. Therefore there is a need to remove and minimize silanol groups on silicalite used in HPLC separations. Such ultrahydrophobic silicalite may be made by steaming silicalite from which the template has been removed and which has been subsequently acid washed, then calcined in the temperature range between about 650° and about 850° C. in an atmosphere containing from about 10 to about 100 wt. % water for times between about 100 to about 1 hours. Steaming is most preferably done at a temperature range in the neighborhood of about 750° C. in a steam atmosphere containing about 100 wt. % water for about 16 hours. After steaming, the ultrahydrophobic silicalites of our invention show less than 1 weight percent water adsorption at 20° C. and 4.6 mm water vapor pressure, preferably no more than about 0.5 weight percent water adsorption, and may show no more than about 0.2 weight percent water adsorption. As a reference point, the as-prepared silicalite generally shows at least 2 weight percent water adsorption under reference conditions.

We also have found that acid washing the silicalite is critical, for without the acid wash free fatty acids are adsorbed by the silicalite but not desorbed from it. The reason for this behavior is not known with certainty, although the behavior itself is certain.

The ultra hydrophobic monodisperse silicalite spheres of our invention are prepared starting with monodisperse silicalites whose particle size and size distribution is critical. A monodisperse particle size between about 1 and about 2 microns is acceptable for use in both analytical and simulated moving bed chromatography, although a particle size between 2 and 6 microns is preferable, and one between 3 and 5 microns is most preferred for analytical applications. Particle sizes in the 10–20 micron diameter region is favored for simulated moving bed chromatography. We previously have defined what is meant by monodisperse spheres. The next stage in the preparation is calcination of the monodisperse silicalite spheres to remove the template. Calcination is performed in the temperature range between about 500° and about 650° C. for a time between about 1 and about 5 hours. Following calcination the monodisperse silicalite spheres are acid washed by treating the silicalite with ca. 1N mineral acid at about 70°–100° C. for 10 minutes up to about 1 hour. Preferably this procedure is repeated 2–3 times. The acid-washed silicalite is then steamed at 650°–850° C. as described above to further reduce its water adsorption capabilities.

EXAMPLES

Preparation of Silicalites

Ludox LS, a colloidal silica sol containing 30 wt % $SiO_2$ (1923.2 g), was mixed with 765 g $H_2O$ in a Waring blender. To this was added 38.4 g NaOH dissolved in 100 g $H_2O$ and 127.7 g tetrapropyl ammonium bromide (TBABr) dissolved in 200 g $H_2O$, and the mixture was homogenized in the blender. This final mixture with molar composition $$0.2\ (TPABr):0.4\ Na_2O:8.0\ SiO_2:113.4\ H_2O$$

was placed in a 1 gallon stainless steel pressure vessel lined with a Teflon sheet, and heated with an electric mantle to 200° C. and held for a total of 73.5 hours. The product, after filtration and $H_2O$ wash, was shown by its x-ray diffraction pattern to be well crystallized silicalite containing a trace amount of quartz impurity as described in U.S. Pat. No. 4,061,724. Microscopic examination of the product showed uniform nearly spherical crystals with predominant size between 3.2 to 3.8 microns.

400 Grams of the silicalite was placed in a large furnace with 20 SCFH air flow and heated to 620° C. and held for 2.5 hours. This calcined sample then was acid washed as follows. 250 grams of the calcined product was stirred at 80°–90° C. for 1.5 hours in 2.5 liters of 1N HCl solution, then filtered and washed with water till the filtrate was chloride-free. The product was dried at 100° C. The product was found by chemical analysis to be essentially pure $SiO_2$, containing 0.0404 wt % $Na_2O$ and 0.0392 wt % $Al_2O_3$ and is sample A.

Subsequent to being acid washed, the sample was steamed as follows. In 4 separate batches, several 30 to 40 gram portions of the acid washed silicalite were suspended on quartz wool in quartz tubes in the isothermal section of a vertical steamer with an upward flow of approximately 100% steam at 1 atm. The steamer temperature was maintained at 750° to 760° C. for 16 hours. The separate batches were combined to give sample B. As a comparison, a portion of this material was calcined without steaming at 800° C. for 2 hours in a dry air purged muffle furnace.

Another batch of silicalite was synthesized in the same way and with the same equipment as described above, except that the proportion of NaOH to the other ingredients was increased by 50%. Again, the product was shown by its x-ray diffraction pattern to be well crystallized silicalite containing a trace amount of quartz impurity as described in U.S. Pat. No. 4,061,724. Optical microscope examination of this product again showed nearly spherical crystals but having a broad distribution of sizes between about 3 to 10 microns. The product was calcined and acid washed as above (but not steamed) except that the acid treatment was done twice. Analysis found 0.017 wt % $Na_2O$ and 0.019 wt % $Al_2O_3$ and is sample C.

One 30 gram portion of sample C was steamed for 16 hrs. at 750°–758° C. as described above to afford sample D. Another portion of this sample was calcined in dry air (no steam) @750° C. for 16 hours to afford sample E. Yet another portion of the acid washed silicalite, sample C, was steamed as described above but for only 1 hour at 750° C. to afford sample F.

Adsorption properties of the foregoing samples are summarized as follows.

TABLE 1

McBain Adsorption results
(samples activated in vacuum @ 350° C.)

| Sample | Description | wt % O2 ads. at 100 torr @ −183 C. | wt % n-C6 ads at 45 mm at R.T. | wt % H2O ads at 4.6 mm @ R.T. |
|---|---|---|---|---|
| A | Calc, AW | 17.5 | nm | 1.9 |
| B | Calc, AW, Steamed @ 750 C. 16 Hr | 15.9 | 10.9 | 0.2 |
| C | Calc, AW | 18.5 | 12.5 | 2.6 |
| D | Calc, AW, Steamed @ 750 C. 16 Hr | 16.8 | 11.5 | 0.14 |
| E | Calc, AW, Recalc. @ 750 C. 16 Hr | 18.4 | 12.3 | 2.7 |
| F | Calc, AW, Steamed @ 750 C. only 1 Hr | 18.5 | 12.5 | 2.1 |

The decreased water adsorption demonstrates the substantially increased hydrophobicity of the 750° C. steamed samples. In contrast, calcination without steam at 750° C. did not reduce the water adsorption. Note that steaming for only 1 hr. at 100% steam, 750° C., only slightly decreased the water adsorption.

Infrared Spectroscopy

Hydroxyl spectra of steamed and unsteamed silicalite samples measured by Fourier transform infrared spectroscopy at several different temperatures show a clear effect of hydroxyl removal with steaming. A dramatic decrease in the amount of adsorbed water on the steamed sample supports the increased hydrophobicity resulting from the steaming process. The unsteamed sample was silicalite calcined at 600° C., then acid washed; the steamed sample was further treated in 100% steam at 750° C. for 16 hours.

Samples were ground to a fine powder using an agate mortar and pestle and pressed at 5000 psig to form a 13 mm diameter self-supporting pellet. The pellet was heated to 100° C. in helium flow for 2 hours. The sample was cooled under helium pressure to room temperature and a spectrum recorded. The same pellet was heated to 500° C. for two hours, cooled to room temperature, and a spectrum recorded. This procedure was repeated, heating the sample to 600° C. All spectra were recorded on a Nicolet Magna 550 FTIR at 2 cm$^{-1}$ resolution using a cooled MCT detector. Data analysis was performed using GRAMS/386 software.

The as-pressed spectra were obtained on the sample pellets as loaded in the IR cell before pretreatment. The unsteamed silicalite sample shows the presence of adsorbed water as evidenced by absorbance around 1635 and 3410 cm$^{-1}$. As expected, the absorbance bands due to adsorbed water disappear after treatment at 100° C. and a broad band due to hydrogen-bonded hydroxyls around 3510 cm-1 remains. Subsequent treatments at 500° and 600° C. decreases the intensity of this band. Another absorbance band around 3740 cm$^{-1}$ was observed and is attributed to isolated surface silanol groups (Si—OH). This band shifts to slightly higher frequencies with higher pretreatment temperatures, indicating some interaction of these silanol groups with those responsible for the 3510 cm$^{-1}$ band.

Analogous spectra for the steamed sample are significantly different from those of the unsteamed silicalite. In the as-pressed spectrum, there are only very weak absorbance bands due to adsorbed water (1635 and 3410 cm$^{-1}$). Also, the distinct hydroxyl absorbance band around 3510 cm$^{-1}$ is missing in the steamed sample and only a very broad band between 3700 and 3000 cm$^{-1}$ can be seen. The surface silanol band around 3740 cm$^{-1}$ is much weaker in the steamed sample, indicating loss of Si—OH groups during the steaming process.

In an attempt to quantitate the steaming effects on water and hydroxyl content of the two samples, the areas of the water bending mode (1635 cm$^{-1}$) and the silanol bands at 3740 cm$^{-1}$ were measured and are reported in Table 2. The water bending mode area was calculated after subtraction of the spectrum measured after 600° C. pretreament to removed absorbance contributions from the zeolite which occur in this region.

TABLE 2

Band Area Comparison

| Sample | 1635 cm$^{-1}$ Band Area/mg | 3740 cm$^{-1}$ Band Area/mg |
|---|---|---|
| unsteamed | 0.998 | 1.98 |
| steamed | 0.129 | 0.287 |

These data show that steaming reduces the amount of amount of adsorbed water by about a factor of 10 and also drastically reduces the total number of hydroxyl groups remaining.

These IR data convincingly show that there is a dramatic decrease in the hydroxyl and water content of the steamed silicalite sample compared to the unsteamed sample. This provides direct support to the increase in hydrophobicity upon steaming.

Performance of Silicalite Adsorbents

Adsorbent performance was referenced by separation of linoleic and oleic acids using mesitylene as the tracer material. In all cases silicalite samples were packed in a column 0.46 cm ID by 25 cm long using a slurry packing technique. The slurry solvent was a mixture of isoproponal and acetone and the push solvent was hexane. Adsorbent was packed at 5,000 psig with the aid of a Haskel pump. The feed was a solution of oleic and linoleic acids (2 mg/mL of each) in methylethylketone and the tracer was mesitylene. The mobile phase consisted of methylethylketone with 0.5 volume % acetic acid at a flow rate of 1 mL/min. The injection volume was 20 microliters with a refractive index detector for eluate.

Sample numbers, where identical, refer to the preparation of silicalites described above. Sample G was obtained from sample A by dry calcination at 800° C.

The results described above are summarized in Table 3. $T_0$ refers to the retention time of the tracer peak, mesitylene, whereas $t_1$ and $t_2$ refer to linoleic and oleic acid respectively. N/m $t_0$ refers to the efficiency (plates per meter) of the tracer peak and N/m $t_1$ and N/m $t_2$ refer to linoleic and oleic acid respectively. $A_1$ which refers to the peak symmetry, is similarly defined. The results in Table 3 indicate that the best performance was obtained with sample B which had a narrow particle size distribution and was very hydrophobic. Sample B (two different columns packed) had the highest efficiency and the highest resolution.

TABLE 3

| Sample | $t_0$ | $t_1$ | $t_2$ | N/m $t_0$ | A $t_0$ | N/m $t_1$1 | A $t_1$ | N/m $t_2$ | A $t_2$ | Res. |
|---|---|---|---|---|---|---|---|---|---|---|
| A | 2.98 | 3.52 | 6.42 | 19,551 | 1.7 | 2,055 | 1.9 | 1,119 | 2.6 | 2.70 |
| G | 2.22 | 3.36 | 5.77 | 21,724 | 1.5 | 2,685 | 1.7 | 1,682 | 2.3 | 2.94 |
| B | 2.23 | 3.66 | 6.70 | 21,861 | 1.5 | 9,908 | 1.1 | 5,830 | 1.6 | 6.12 |
| B | 2.22 | 3.62 | 6.60 | 20,457 | 1.6 | 7,321 | 0.9 | 7,040 | 1.3 | 6.18 |
| D | 2.18 | 3.67 | 7.09 | 14,966 | 0.8 | 4,389 | 1.0 | 1,939 | 2.2 | 3.96 |

The silicalite material prepared under synthesis conditions to give a spherical material with a narrow particle size distribution followed by a post treatment of calcination at 600° C., an HCl wash and steaming at 750° C. gives superior performance for the separation of fatty acids. The optimum particle size for analytical separations is believed to be in the range of 3 to 5 microns.

We claim as our invention:

1. As an article of manufacture, ultrahydrophobic monodisperse silicalite spheres of diameter between about 1 and about 20 microns having an adsorption capacity for water of no more than 1.0 weight percent at 20° C. and 4.6 mm water vapor pressure.

2. The article of manufacture of claim 1 where the adsorption capacity for water is no more than about 0.5 weight percent.

3. The article of manufacture of claim 1 where the sphere diameter is between about 2 and about 6 microns.

4. The article of manufacture of claim 1 where the sphere diameter is between about 3 and about 5 microns.

5. The article of manufacture of claim 1 where the sphere diameter is between about 10 and about 20 microns.

* * * * *